United States Patent
Graf et al.

(10) Patent No.: US 7,540,987 B1
(45) Date of Patent: *Jun. 2, 2009

(54) ORTHOPEDIC CASTING SLIPPER KIT AND METHOD

(76) Inventors: Peter M. Graf, 566 11th Ave., San Francisco, CA (US) 94118; Richard M. Stess, 36 Dutch Valley La., San Anselmo, CA (US) 94960

(*) Notice: Subject to any disclaimer, the term of this patent is extended or adjusted under 35 U.S.C. 154(b) by 611 days.

This patent is subject to a terminal disclaimer.

(21) Appl. No.: 11/280,496

(22) Filed: Nov. 16, 2005

Related U.S. Application Data

(63) Continuation-in-part of application No. 10/678,917, filed on Oct. 2, 2003, now Pat. No. 6,981,856.

(51) Int. Cl.
*B29C 33/00* (2006.01)
(52) U.S. Cl. .......................... 264/223; 425/2
(58) Field of Classification Search ................. 264/223; 425/2
See application file for complete search history.

(56) References Cited

U.S. PATENT DOCUMENTS

| | | | |
|---|---|---|---|
| 1,532,432 A | 4/1925 | Morse | |
| 1,647,639 A | 11/1927 | Larson | |
| 2,136,815 A | 11/1938 | Forster et al. | |
| 2,593,742 A | 4/1952 | Friedman | |
| 2,856,633 A | 10/1958 | Murray | |
| 2,894,288 A | 7/1959 | Brindis | |
| 2,907,067 A | 10/1959 | Berger | |
| 2,924,849 A | 2/1960 | Buchman | |
| 2,952,082 A | 9/1960 | Murray | |
| 2,955,326 A | 10/1960 | Murray | |
| 2,961,714 A | 11/1960 | Murray | |
| 3,320,347 A | 5/1967 | Greenawalt | |
| 4,026,046 A | 5/1977 | Clark et al. | |
| 4,583,304 A | 4/1986 | Spalding | |
| 4,616,428 A | 10/1986 | Leger | |
| 5,228,164 A | 7/1993 | Graf et al. | |
| 5,258,036 A | 11/1993 | Edenbaum et al. | |
| 6,533,971 B1 | 3/2003 | Stess et al. | |
| 6,981,856 B2 | 1/2006 | Graf et al. | |
| 2006/0076706 A1* | 4/2006 | Buethorn | 264/223 |

* cited by examiner

*Primary Examiner*—Mary Lynn F Theisen
(74) *Attorney, Agent, or Firm*—Dorsey & Whitney LLP

(57) ABSTRACT

An orthopedic casting slipper kit for custom molding of a foot impression including a low-cut impression slipper shaped to extend upwardly on a patient's foot from a plantar surface of the foot to an open end. The impression slipper is made from a fabric that is sufficiently resilient so as to enable the impression slipper to substantially conform to the patient's foot. A support element is coupled to the impression slipper and extends around at least a portion of the patient's foot for holding the impression slipper snug against the patient's foot. A quantity of curable resin is provided for impregnation into the fabric of the impression slipper and is sufficient to harden the impression slipper into a cast foot impression.

11 Claims, 2 Drawing Sheets

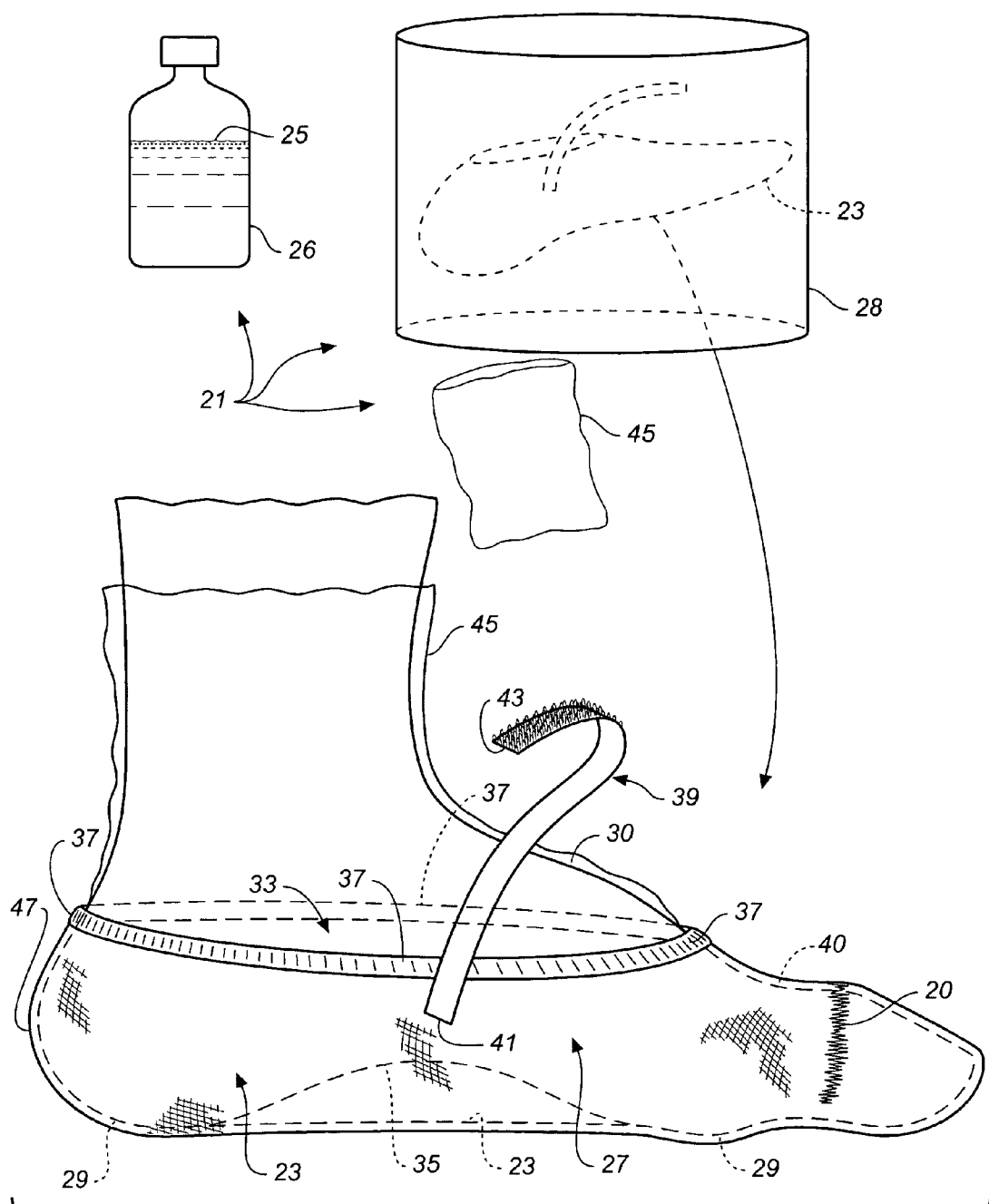
FIG._1

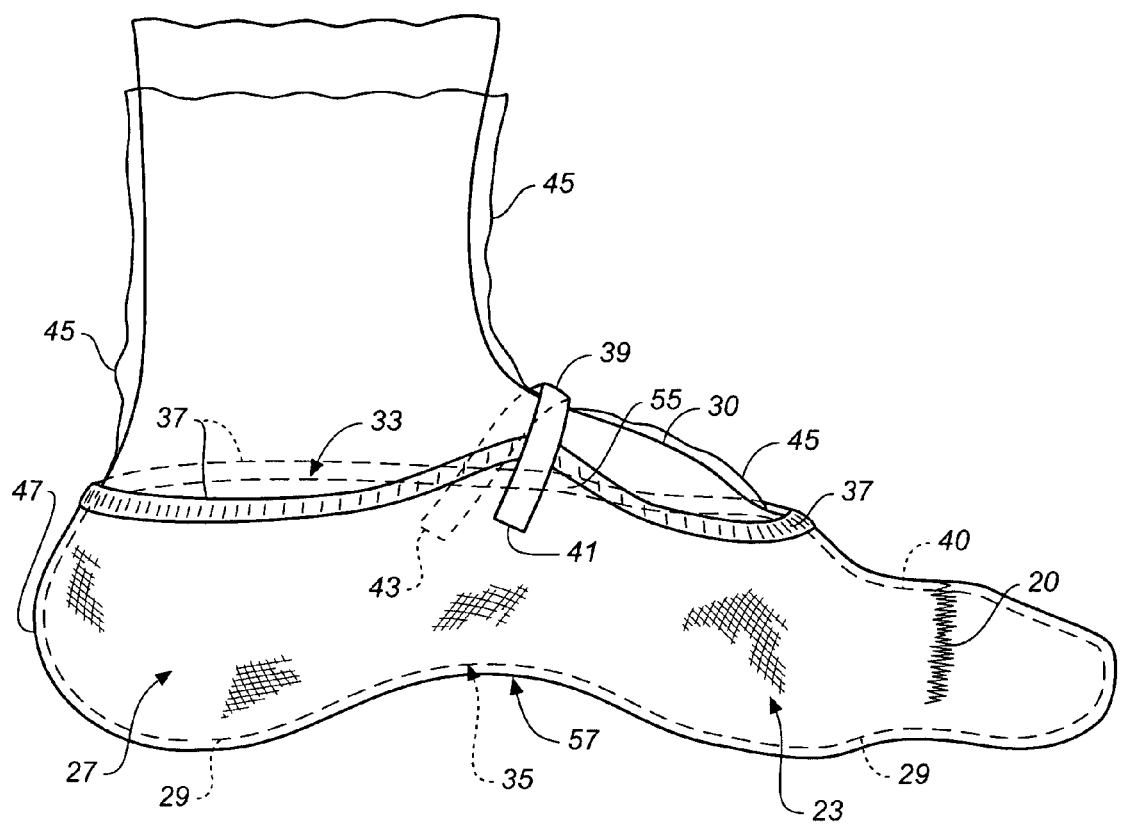
FIG._2

ORTHOPEDIC CASTING SLIPPER KIT AND METHOD

CROSS REFERENCE TO RELATED APPLICATIONS

This application is a continuation-in-part of U.S. patent application Ser. No. 10/678,917 filed Oct. 2, 2003, the entire content of which is incorporated herein by this reference.

TECHNICAL FIELD

The present invention relates, in general, to kits and methods for making custom molded impressions useful for the formation of orthopedic devices, and more particularly, relates to kits and methods for making custom molded foot impressions for the formation of orthotics.

BACKGROUND ART

Considerable effort has been directed toward the custom molding or formation of foot impressions or casts which, in turn, may be used to form foot orthotic devices. Early approaches included the use of gauze strips and plaster of paris to build up a casting or custom impression of the foot which, when hardened, was removed from the foot. A positive impression was made inside the hardened casting, and then the negative cast was removed and the orthotic device made from the positive impression.

This procedure was time-consuming, messy, somewhat inaccurate and the custom casting impression which was made was suitable only for making a single positive mold of the foot.

The gauze strip process was improved in a system shown in U.S. Pat. No. 2,593,742 to Friedman. In Friedman a slipper-shaped fabric casting form was substituted for the plurality of gauze strips to make the casting. The pre-shaped slipper form was impregnated with plaster of paris, or some other material which is capable of hardening upon the application of water. Once hardened, the custom casting or impression of the foot was removed from the foot, and again, a positive was made inside the custom casting.

While the approach taken in Friedman reduced some of the messiness and handling problems, there were still substantial disadvantages. The Friedman pre-shaped slipper form only loosely fit the patient's foot, and when moistened with water, the operator had to press or fold the plaster of paris containing cloth down against the foot, which was messy and created folds which detracted from the accuracy of the custom casting. Friedman also had the disadvantage of being capable of making only a single positive foot replica from the custom impression.

Various other custom impression kits are also found in the patent literature. Most of these kits are based upon the use of strips of fabric material or moldable surfaces against which the foot can be held. Typical of these prior art devices are the kits or casting systems disclosed in U.S. Pat. Nos. 1,647,639; 2,136,815; 2,856,633; 2,894,288; 2,907,067; 2,952,082; 2,955,326; 2,961,714 and 3,320,347.

A commercially available moldable surface system for making orthotics is the BIO-FOAM System produced by Smithers Bio-Medical Systems of Kent, Ohio. The BIO-FOAM system is based upon a foam material into which the patient presses his or her foot. The foam deforms to the shape of the plantar surface of the foot, and the deformed foam can be used to make a positive plaster cast of the plantar surface. Casting the arch using the BIO-FOAM system can cause problems in that pushing down on the foam to deform it tends to flatten the arch. Shipping the deformed foam cast from the technician taking the impression to the laboratory making the positive cast also can result in damage to the deformed foam impression.

More recently, water-hardenable resins have been used in connection with knit fabric material to produce a variety of custom impression products. Typical of such resin-based custom casting systems are the kits set forth in our U.S. Pat. No. 5,228,164 for the preparation of a custom last for preparing footwear, and U.S. Pat. No. 6,533,971 for the preparation of an orthopedic impression shirt, both of which patents contain technology useful in the present invention, and accordingly, are incorporated by reference into this application.

In U.S. Pat. No. 5,228,164, an elastic casting sleeve, or tubular shell-forming fabric member, is employed which can be slipped over the patient's foot and has sufficient extensibility and resilience to conform to the foot and present a smooth exterior surface which permits the hardened sleeve to act as a shell for the preparation of custom footwear. The sleeve contains or may have resin added to it which is water activatable so as to harden in a short period of time while on the patient's foot. The hardened sleeve can then be cut off the foot, and it is sufficiently thin and smooth so as to enable its use as a positive casting for the formation of custom footwear over the outside of the hardened sleeve. The interior of the sleeve can also be used to form positive castings in a conventional manner.

It has been found, however, that the use of such casting sleeves for the formation of orthotics that engage primarily the plantar surface of the foot is not very practical. The prior art impression sleeve comes up undesirably high on the patient's foot, and there is a tendency for the elasticity of the fabric to cause the sleeve to "bridge" or "tent" in the area of the arch of the foot. Since orthotics often are designed to provide arch support, such bridging or tenting is highly undesirable.

Accordingly, it is an object of the present invention to provide a custom molded orthopedic casting slipper kit which can be used to create a more accurate impression of a patient's plantar foot surface for subsequent production of a foot orthotic device.

Another object of the present invention is to provide an orthopedic casting slipper which is easy to use and particularly is easily removed after hardening without the need to employ a cast cutter or scissors.

A further object of the present invention is to provide an orthopedic casting slipper kit which can be used to form an impression of a patient's foot, and particularly the plantar surface thereof, in a relatively short period of time with minimal attendant messiness.

A further object of the present invention is to provide an orthopedic casting slipper kit which can be easily used by medical technicians and podiatrists.

The orthotic casting slipper kit and method of the present invention and other objects and features of advantage which will become apparent from, or are set forth in more detail in, the accompanying drawing and following description of the Best Mode of Carrying Out the Invention.

DISCLOSURE OF THE INVENTION

The orthopedic casting slipper kit of the present invention is based, briefly, on a resilient fabric impression slipper extending upwardly on a patient's foot from a plantar surface to an opened end proximate the patient's instep. The slipper fabric is sufficiently resilient to substantially conform to the patient's foot, and a resilient, longitudinally extensible band is provided on the slipper proximate the opened end, and the band is formed to hold the opened end snugly against the patient's instep and heel. The kit also includes a quantity of curable resin sufficient to harden the impression slipper into a hardened cast foot impression. Preferably the resin is impregnated into the fabric of the impression slipper and the slipper and resin are stored in a resin-impervious or airtight pouch. Alternatively, the resin may be provided in a container separate from the impression slipper. In the most preferred form, the kit further includes an arch strap dimensioned to span transversely across the dorsum of the patient's foot and the opened end of the impression slipper from a medial to a lateral side thereof in an area over the patient's arch, and the arch strap is securable to the slipper on the medial and lateral sides of the instep and formed to pull the impression slipper up into contact with the patient's arch.

The method of creating a custom molded foot impression of the present invention is comprised, briefly, of the steps of mounting an elastic resin-impregnated impression slipper over a patient's foot, the slipper having an arch strap attached to one of a medial side and a lateral side of the slipper (preferably the medial side); pulling the slipper up into contact with the patient's arch; while the slipper is in contact with the patient's arch, fastening the arch strap to the other of the medial side and the lateral side of the slipper to maintain the slipper in contact with the patient's arch; manipulating the patient's foot to achieve a desired orientation; and hardening the resin in the slipper while the patient's foot is in the desired orientation.

BRIEF DESCRIPTION OF THE DRAWING

FIG. 1 is a medial side elevation view of an orthopedic casting kit with a resilient fabric impression slipper from the kit mounted on the left foot of a patient.

FIG. 2 is a medial side elevation view corresponding to FIG. 1 with the impression slipper snugged up against the patient's arch.

BEST MODE OF CARRYING OUT THE INVENTION

Reference will now be made in detail to the preferred embodiment of the present invention, an example of which is illustrated in the accompanying drawing. While the invention will be described in conjunction with the preferred embodiment, it will be understood that it is not intended to limit the invention to that embodiment. On the contrary, the invention is intended to cover alternatives, modifications and equivalents which may be included within the spirit and scope of the invention as defined by the appended claims.

The orthopedic casting slipper kit, generally designated 21, of the present invention includes a resilient fabric impression slipper 23 and a quantity of curable resin 25 sufficient to harden fabric slipper 23 into an impression of a patient's foot 27 and particularly the plantar surface 29 thereof. Impression slipper 23 has the shape of a relatively low-cut slipper and it extends from plantar aspect or surface 29 of the patient's foot up to a position below the dorsum 30 of the foot. The upper end of the slipper is open at 33 to allow the patient to easily slip the slipper onto foot 27 and after it has hardened, to enable its easy removal, which is an important feature that will be described below.

Fabric impression slipper 23 is a preformed slipper shape, as is true of the casting form of the prior art Friedman U.S. Pat. No. 2,593,742, but the fabric material in the impression slipper of the present invention, unlike. Friedman, is elastic and resilient so as to substantially conform to the patient's foot. Thus, the folds which can result from the use of flexible but non-resilient gauze-like material are not present. The material which is most suited for use in slipper 23 is an elastic knit fabric, such as polyester or a polyester-spandex combination, or a fabric as set forth in U.S. Pat. No. 5,228,164. The elasticity of such fabrics, as used in the present invention, also tend to cause them to tent or bridge across arch 35 of the foot, as shown best in FIG. 1.

It is believed that four sizes of resilient casting or impression slippers will be all that is required to cover the normal foot sizes for an average patient population, namely, small, medium, large and extra large. In fact, it is a feature of the present invention to employ a limited number of slipper sizes and to color code them, for example, by a sewn color thread 20 on white slipper fabric Thus as a particular patient's foot is at an end of one of these ranges (looser fit), a high degree of conformance is difficult to achieve by relying merely on the resiliency in the fabric itself; Moreover, at an opposite end (tighter fit) there will be a greater tendency to bridge across arch 35 due to fabric resiliency.

Accordingly, impression slipper 23 of the present invention is further provided with a resilient band 37 provided on slipper 23 proximate opened end 33. Band 37 is formed to resiliently contract along its length so as to hold opened end 33 of slipper 23 snugly against the patient's dorsum and heel area. As can be seen in the drawing, band 37 encircles the patient's foot 27 so as to augment the resiliency in the slipper fabric and so as to create improved overall conformance of the impression slipper to the patient's foot. Band 37 also will tend to pull the slipper upwardly so as to reduce somewhat tenting or bridging of slipper 23 in the area of the arch 35. The band 37 can be formed in any suitable manner. In one embodiment, band 37 includes a strip of elastic or extensible material that is carried by the material of slipper 23, for example by being folded over the upper edge of fabric slipper 23 and enclosed within stitching secured to the slipper 23. In another embodiment, band 37 can be formed as a compression cuff, such as a fully fashioned compression cuff, provided proximate opened end 33, or by any other suitable means. In a further embodiment, band 37 can include a string or similar elongate member slidably disposed in a channel or sleeve formed around the upper edge of the fabric slipper 23, with the two ends of the string extending out of respective openings provided in the sleeve so as to permit the string to be drawn taught within the sleeve and around the opened end 33 of the slipper 23 and the two ends of the string tied together to retain the, string in its taught position.

One of the features of the present invention is that casting or impression slipper 23 is relatively low cut, that is, the top 33 is only about one quarter to one-third of the way up dorsum 30 from the base 40 of the patient's toes. This low cut feature facilitates removal of the hardened slipper but it also reduces the ability of elastic band 37 to pull the slipper upwardly to enhance conformance.

In order to obtain even better conformance of impression slipper 23 to foot 27 than band 37 alone can provide on a low-cut slipper, it is preferable that an arch strap 39 be provided which is dimensioned to span transversely over dorsum 30 of the foot and across open end 33 of the impression slipper. Thus, arch strap 39 is securable at one end 41 to a medial side of slipper 29 and at the other end 43 to a lateral side of the slipper in the area of the sides of the foot proximate arch 35.

Arch strap 39 will most preferably be provided as a band of hook-type fastener material in which the hooks extend over the entire length of strap 39. It can also be provided by a strap which is permanently secured, for example by sewing, to one location of the slipper, for example to one of the medial and lateral sides of the impression slipper, and releasably securable to another location of the slipper, for example the other of the medial and lateral sides. In the most preferred form, the hook-type fastener material extends on the inside of the strap from end 41 to end 43 of strap 39, with the resilient slipper fabric 23 providing the loop structure to which hooks material of strap 39 can be releasably coupled. Such hook-and-loop fastener assemblies, of course, are commercially distributed under the trademark VELCRO, and a band of the hooks portion of such fastener assemblies is well suited for hooking to a knit fabric slipper.

It will be understood that other types of fasteners could be employed, such as snaps, clips, buttons, etc. Additionally, arch strap 39 could be resilient or elastic and sewn to both sides of the slipper, but an elastic strap could require scissors to remove and might not be able to attain the conformance that would be otherwise desirable.

Even when fasteners are employed arch strap 39 could also be resiliently extensible so as to pull the slipper up into tight conformance with arch 35, but that is not required because fabric material 23 itself is resilient. Thus, a substantially non-extensible arch strap 39 is preferred and the arch strap can be hooked to the medial side of the slipper and used to pull the medial side of the slipper upwardly against the arch. Then the hooks fastener strap 39 can be used to secure the arch strap in place on the lateral side of the slipper, with the resiliency of fabric 23 ensuring conformance. This configuration is shown in FIG. 2 in which the medial side of the slipper has been pulled upwardly at 55 on the dorsum, and the lower side of the slipper pulled into contact with arch 35 at 57.

Resin 25 suitable for use with the slipper-shaped impression fabric form 23 can advantageously be a water hardenable resin, such as a polyurethane resin of the type disclosed in our U.S. Pat. No. 5,228,164. Resin 25 preferably is previously impregnated into slipper-shaped form 23, or it can be provided in a separate container 26. If resin 25 is impregnated in impression slipper fabric 23, the slipper 23 and resin 25 will be stored in a closed pouch or envelope 28 to which the resin will not bond. If a separate resin container 26 is used, the slipper form 23 can be stored in open air with resin 25 being added to fabric slipper 23 immediately before placing the slipper on the patient's foot, or after it has been placed on the patient's foot.

Having described the components of the orthopedic casting slipper kit of the present invention, it's use and the method of the present invention can be described.

Most typically as a first step, a release envelope 45 will be mounted over the patient's foot so that the resin 25 does not adhere to the patient during hardening. Such a flexible envelope can have a very thin wall thickness, for example, it can be provided by 0.002 inch thick. polyethylene or a similar very thin film. Once the foot is covered by envelope 45, the present method includes the step of mounting a resilient impression slipper 23 having a curable resin impregnated therein over the patient's foot 27. The mounting step can be accomplished by mounting the slipper on the patient's foot when it is dry and then impregnating the fabric with resin. Strap 39 will be attached to the slipper, preferably first on the medial side of the slipper, and the impression slipper will have an elastic band 37 that snugs the slipper down against the foot over the release envelope 45 into good conformance with the shape of foot 27.

The next step of the present method is designed to ensure arch conformance, and it is the step of pulling the slipper up into contact with the patient's arch, most preferably by using arch strap 39. With the slipper in contact with the patient's arch, the step of fastening arch strap 39 to the lateral side of the slipper is undertaken so as to maintain fabric impression slipper 23 in contact with arch 35 of the foot. The technician, podiatrist, orthotist, prosthetist, pedorthist, or orthopedic shoe technician can then smooth or ease the resin impregnated slipper on the patient's foot to further assist in conformance and to remove any wrinkles and thereafter manipulate the patient's foot to achieve a desired orientation. Finally, the resin in the slipper is hardened while the patient's foot is in the desired orientation.

Most typically, hardening of the resin will be accomplished by spraying water on the slipper 23 while on the patient's foot, or dipping the slipper in water prior to application to the foot to begin activation of the resin hardening process. Hardening typically requires only 2 or 3 minutes to reach a sufficiently hard state to enable removal of the cast slipper. The relatively rapid hardening of the water activatable resin also minimizes the time during which the patient must maintain his foot in a desired orientation while the custom impression sets up. The technician will wear gloves which will not adhere to the water hardenable resin during the foot manipulation process, or a second envelope or bag can be mounted over the resin impregnated slipper. Manipulation of the foot typically is accomplished to place the foot in the "neutral" position (one-third of the distance from full pronation to full supination). An upward pressure on the fore foot is one way to lock the bones in a semi-weight bearing neutral position, but other casting positions can also be employed, in the judgment of the technician.

Once the impression slipper has hardened, it can be removed from the patient's foot by releasing the arch strap by pulling upwardly. Hooks in strap 39 at ends 41 and 43 will be cast into the slipper fabric, but the hooks will break off relatively easily to allow the arch strap 39 to be pulled off to release end 43 of the strap. The technician can then simply pull gently down in the area of the heel, while the patient wiggles his or her toes. The relatively low-cut position of open end 33 on the dorsum will facilitate removal of hardened slipper 23 without the need for cutting of the impression slipper.

The hardened slipper impression can then be sent to a separate lab for formation of a foot orthotic from the hardened slipper, through scanning or formation of positives. The same slipper can be used to form a plurality of positive casts since the hardened resin and fabric will not be destroyed, as is the case with plaster of paris casts, if the slipper is cut to release the positive. Hardened slipper 23 may be cut by making a first downward cut in the area of the back of the heel 47 to the plantar aspect of the heel 29 and a second cut starting proximate the anterior opening of the slipper directed toward the middle toe area and ending proximate to the colored stitch line 20. The hardened slipper can then be bent in medial and lateral directions outwardly to release a hardened positive casting inside the slipper. It is a simple matter to bend the hardened slipper back together and secure it for manufacture of subsequent positive casts.

Although the orthopedic casting slipper kit of the present invention has been described with one arch strap 39, in another embodiment the slipper kit can be provided with no arch strap 39 or one or more arch straps for attachment to the slipper 23 at other locations than described above with respect to strap 39. For example, any suitable strap (not shown), such as of the type described above with respect to strap 39, can be attached at each end to the rear of slipper 23 proximate opened end 33 and extend over dorsum 30, and can be used in conjunction with or as an alternative to strap 39.

In a further embodiment of the slipper kit of the present invention, a sock-like member or sock made from any suitable material such as a fiber-woven material such as cloth and more preferably cotton can be provided between envelope 45 and the slipper during the molding and curing of the slipper. Such sock, which may adhere to the material of the slipper 23 during curing, provides a smooth inner surface for the slipper, which can be advantageous during the formation of a foot orthotic from the slipper 23.

What is claimed is:

1. An orthopedic casting slipper kit for custom molding of a foot impression comprising;
    (a) a low-cut impression slipper shaped to extend upwardly on a patient's foot from a plantar surface of the foot to an open end sufficiently low to enable removal of the hardened slipper without cutting, the impression slipper made from a fabric that is sufficiently resilient so as to enable the impression slipper to substantially conform to the patient's foot;
    (b) a support element coupled to the impression slipper and extending around at least a portion of the patients foot for holding the impression slipper snug against the patient's foot; and
    (c) a quantity of curable resin for impregnation into the fabric of the impression slipper and sufficient to harden the impression slipper into a cast foot impression.

2. The kit as defined in claim 1 wherein the support element is a longitudinally resiliently extensible band provided on the impression slipper proximate the open end, the band being formed to hold the open end of the impression slipper snugly against the patient's dorsum and heel.

3. The kit as defined in claim 2 wherein the band is a compression cuff formed from the material of the impression slipper.

4. The kit as defined in claim 1 wherein the support element is an arch strap dimensioned to span transversely over the dorsum of the patient's foot and across the open end.

5. A method of creating a custom molded foot impression comprising the steps of:
    mounting a low-cut resilient impression slipper having a curable resin impregnated therein over a patient's foot, the impression slipper having an arch strap attached to one of a medial side and a lateral side of the impression slipper;
    pulling the impression slipper up into contact with the patient's arch;
    while the impression slipper is in contact with the patient's arch, fastening the arch strap to the other of the medial side and the lateral side of the impression slipper to maintain the impression slipper in contact with the arch;
    manipulating the patient's foot to achieve a desired orientation; and
    hardening the resin in the impression slipper while the patient's foot is in the desired orientation.

6. The method as defined in claim 5 wherein,
and prior to the pulling step attaching one end of the arch strap to a medial side of the impression slipper; and
during the pulling step, using the arch strap to pull the impression slipper into contact with the arch.

7. The method as defined in claim 6 wherein,
the fastening step is accomplished by hooking a strip of hook fasteners provided on the arch strap to the lateral side of the impression slipper.

8. The method as defined in claim 5 and the step of:
prior to the mounting step, mounting a release envelope over the patient's foot.

9. The method as defined in claim 5 and,
after the hardening step, removing the hardened impression slipper from the patient's foot; and
making a foot orthosis using the hardened impression slipper.

10. The method as defined in claim 9 wherein,
the making step is accomplished by placing a casting material inside the hardened impression slipper and removing the hardened casting material from inside the hardened impression slipper by cutting the hardened impression slipper downwardly in the area of the heel and downwardly and anteriorly from the anterior or front margin of the opening of the slipper toward the area of the middle toe ending at the stitch line and bending the medial and lateral sides of the hardened slipper outwardly to release the hardened casting material.

11. An orthopedic casting slipper kit for custom molding of a foot impression comprising;
    (a) a low-cut impression slipper shaped to extend upwardly on a patient's foot from a plantar surface of the foot to an open end sufficiently low to enable removal of the hardened slipper without cutting, the impression slipper made from a fabric that is sufficiently resilient so as to enable the impression slipper to substantially conform to the patient's foot;
    (b) compression cuff formed from the material of the impression slipper extending around at least a portion of the patient's foot for holding the impression slipper snug against the patient's foot; and
    (c) a quantity of curable resin for impregnation into the fabric of the impression slipper and sufficient to harden the impression slipper into a cast foot impression.

* * * * *